United States Patent [19]
Miller

[11] Patent Number: 4,740,023
[45] Date of Patent: Apr. 26, 1988

[54] ARTICLE ENGAGING AND HOLDING DEVICE

[76] Inventor: Robert Miller, 67-A Greenpond Rd., Sherman, Conn. 06784

[21] Appl. No.: 17,475

[22] Filed: Feb. 24, 1987

[51] Int. Cl.$^4$ ............................................... B66C 1/00
[52] U.S. Cl. ...................................... 294/1.1; 294/15; 294/61; 411/400
[58] Field of Search ...................... 294/1.1, 5.5, 14–17, 294/26, 27.1, 61, 66.1, 82.1, 82.11, 82.13, 89, 86.4, 93, 117, 121; 16/114 R; 81/3.45, 8.1; 403/343; 411/400, 401; 441/51

[56] References Cited

U.S. PATENT DOCUMENTS

| | | | |
|---|---|---|---|
| 27,615 | 3/1860 | Byrn | 81/3.45 |
| 39,128 | 7/1863 | Dick | 294/121 |
| 481,724 | 8/1892 | Westover | 411/401 X |
| 1,437,252 | 11/1922 | Kinnaird | 294/1.1 X |
| 1,538,867 | 5/1925 | Garvin | 294/1.1 X |
| 1,635,259 | 7/1927 | Critchley | 294/15 X |
| 3,492,033 | 1/1970 | Mueller | 294/1.1 X |
| 3,556,577 | 1/1971 | Brasseur | 294/15 X |
| 4,079,983 | 3/1978 | Mastrigt | 294/89 |
| 4,098,442 | 7/1978 | Moore | 294/26 X |

FOREIGN PATENT DOCUMENTS 16355 10/1906 Norway ............................. 411/401

Primary Examiner—Johnny D. Cherry
Attorney, Agent, or Firm—Haynes N. Johnson

[57] ABSTRACT

A device for engaging and holding an article, such as a wood log, to facilitate moving the same, includes a bolt with a point that may be modified to a smaller than standard conical angle, the point having runout threads thereon, and a handle rigidly secured to the bolt at a location spaced axially from the point and projecting laterally from the bolt axis. A user can wield the device by the handle to strike the article with the point to cause the point to penetrate the article, following which the user can rotate the handle about the bolt axis to force the bolt thread into threaded engagement with the article. The device also has a shackle rigidly secured to the handle at a location in line with the bolt axis with the bolt and the shackle extending in opposite directions from the handle, so that the shackle can be grasped to move the article with the bolt in threaded engagement therewith.

7 Claims, 2 Drawing Sheets

4,740,023

ARTICLE ENGAGING AND HOLDING DEVICE

BACKGROUND OF THE INVENTION

The present invention relates to article engaging and holding devices and more particularly to a wood holding and engaging device and still more particularly to a wood holding and engaging device to facilitate moving the wood.

The following U.S. Patents are mentioned as representing background prior art, but none are pertinent to the invention, either structurally or functionally:

| U.S. Pat. No. | Date | Inventor(s) |
| --- | --- | --- |
| 74,253 | February 11, 1868 | Sutherland |
| 1,482,056 | January 29, 1967 | Watkins |
| 2,505,923 | May 2, 1950 | Taylor et al. |
| 2,819,111 | January 7, 1972 | Cozzens |
| 4,364,592 | December 21, 1982 | Jackson |
| 4,477,113 | October 16, 1984 | Lybolt |

It is an important object of the invention to provide a device for engaging and holding an article, such as a wood log, to facilitate moving the same, which device can be wielded by hand to penetrate the article, and then rotated into threaded engagement with the article.

It is another object to provide such a device having simple means facilitating moving the article, either manually or by powered equipment, after the threaded engagement of the device with the article has been achieved.

It is a further object to provide such a device that is of simple construction, with no moving parts.

Additional objects and advantages will appear hereinafter.

SUMMARY OF THE INVENTION

The invention presents a device for engaging and holding an article, such as a wood log, to facilitate moving the same, the device including a bolt with a point that may be modified to a smaller than standard conical angle, the point having threads thereon, and a handle rigidly secured to the bolt at a location axially spaced from the point and projecting laterally from the bolt axis.

A user can wield the device by the handle to strike the article with the point to cause the point to penetrate the article, following which the user can rotate the handle about the bolt axis to force the bolt threads into threaded engagement with the article.

The device further has a shackle rigidly secured to the handle at a location in line with the bolt axis with the bolt and the shackle extending in opposite directions from handle, so that the shackle can be grasped to move the article with the bolt in threaded engagement therewith.

The above and other objects and advantages will appear hereinafter.

DESCRIPTION OF THE INVENTION

Figure 1:
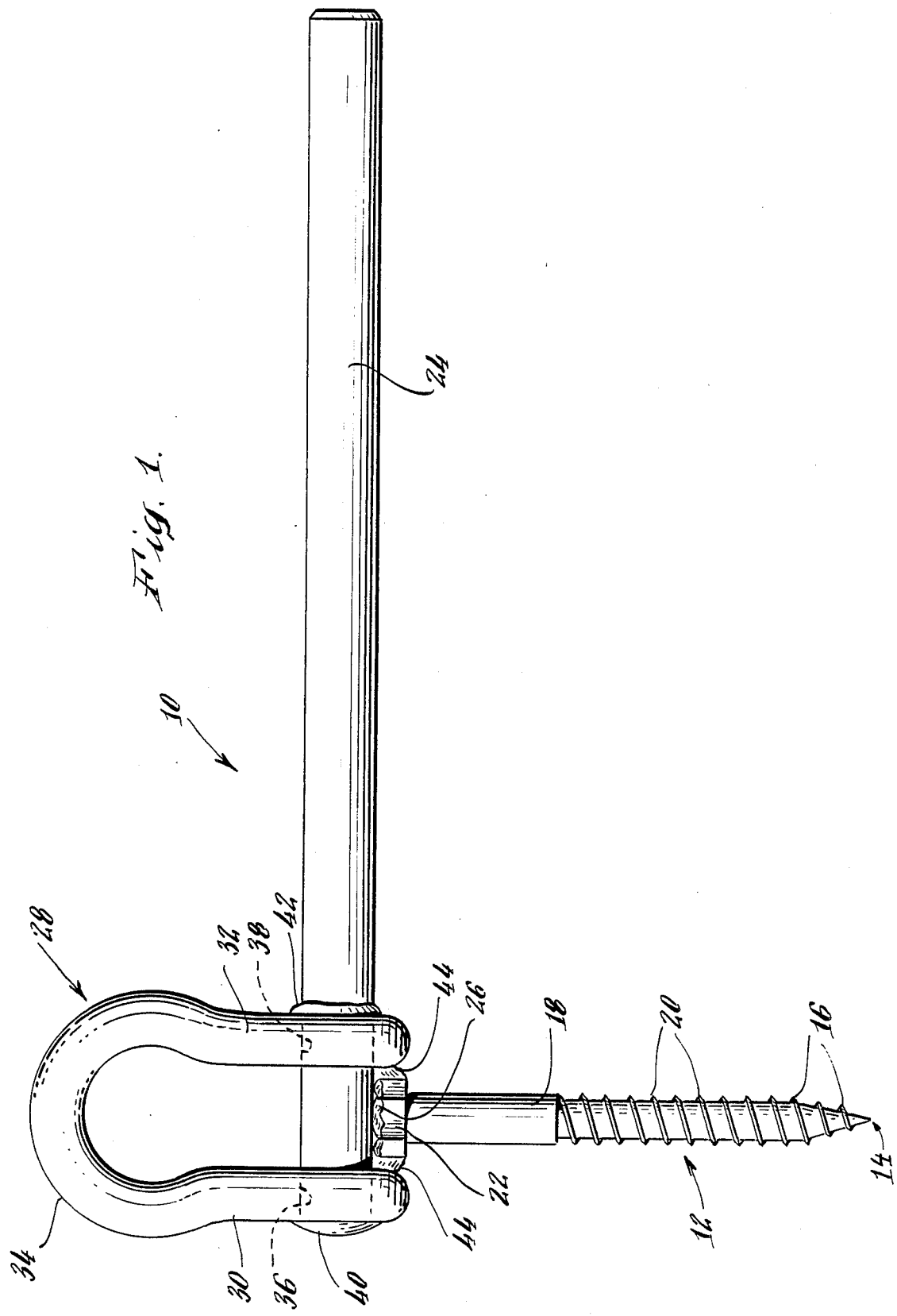
FIG. 1 is a side elevation of a device that is a preferred embodiment of the invention.

The drawing shows a device, indicated generally at 10, for engaging and holding an article such as a wood log 11 (FIG. 2), to facilitate moving the same.

Device 10 comprises a lag bolt 12 having at one end a conical point 14 with runout threads 16 thereon, a cylindrical shank 18 with full threads 20 thereon, merging with runout threads 16, and a head 22 at the other end.

Device 10 also comprises a rigid handle 24 in the form of a solid cylindrical steel rod. Handle 24 is rigidly secured to bolt 12, as by welding as indicated at 26, at a location spaced axially from point 14. As shown, this location is head 22. Handle 24 projects laterally a substantial distance from the axis of bolt 12. More particularly, handle 24 is perpendicular to bolt 12.

The length of handle 24 is about 12 inches (30.5 cm.) and it is about 0.5 inch (1.27 cm.) in diameter.

The structure of device 10 so far described is such that a user can grasp device 10 by handle 24 and wield the same to strike an article, such as log 11 to cause point 14 of bolt 12 to penetrate log 11 and then rotate handle 24 to turn bolt 12 about its axis to force runout threads 16 and then full threads 20 into threaded engagement with the article. The article can then be moved, if it is not too heavy, by grasping handle 24 near its juncture with bolt 12.

Device 10 as shown further includes a rigid steel shackle 28 rigidly secured to handle 24 at a location substantially coincident with the axis of bolt 12, with bolt 12 and shackle 28 extending in opposite directions from handle 24. More particularly, shackle 28 has spaced legs 30 and 32 joined by an arcuate loop portion 34, legs 30 and 32 having therethrough aligned holes 36 and 38, respectively, through which handle 24 passes. Bolt head 22 is between the free ends of legs 30 and 32, and shackle 28 is secured to handle 24 by being welded thereto as indicated at 40 and 42, with loop portion 34 of shackle 28 being as far as possible from bolt point 14. Furthermore, bolt head 22 can be welded to shackle 28 as indicated at 44.

Further as shown, one end of handle 24 projects only minimally from leg 30 of shackle 28 so that the other end of handle 24 projects a substantial distance from leg 32.

Figure 2:
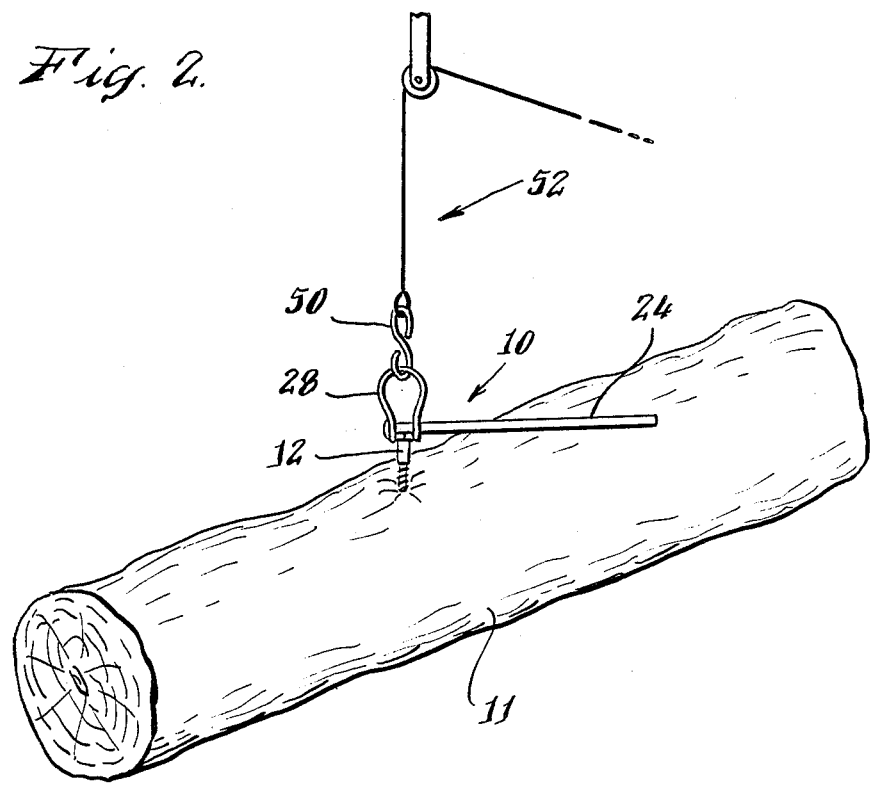
FIG. 2 is a view showing the device of FIG. 1 engaging a log to lift and move same.

Shackle 28 provides additional means for grasping device 10 to move an article with which bolt 12 is in threaded engagement. More particularly, as shown in FIG. 2, shackle 28 can be engaged by a hook 50 of a winch, indicated generally at 52, or other powered equipment, for lifting and moving log 11.

It is common for lag bolts to be supplied with points having a standard conical angle of about 60 degrees. Operation of device 10 is enhanced if point 14 is modified to a smaller than standard conical angle, such as about 30 degrees, and runout threads reformed to full thread depth thereon. This sharpening of point has been found to facilitate article penetration by bolt 12.

Bolt thread 20 is 0.375 inch (0.95 cm.) in diameter and has seven threads per inch (2.76 per cm.) and bolt 12 is about 4.5 inches (11.4 cm.) long. Shackle 28 extends about 2.5 inches (6.4 cm.) from handle 24 and is formed of a cylindrical steel rod about 0.5 inch (1.27 cm.) in diameter, and legs 30 and 32 are spaced apart about 1.0 inch (2.54 cm.) between holes 36 and 38.

Figure 3:
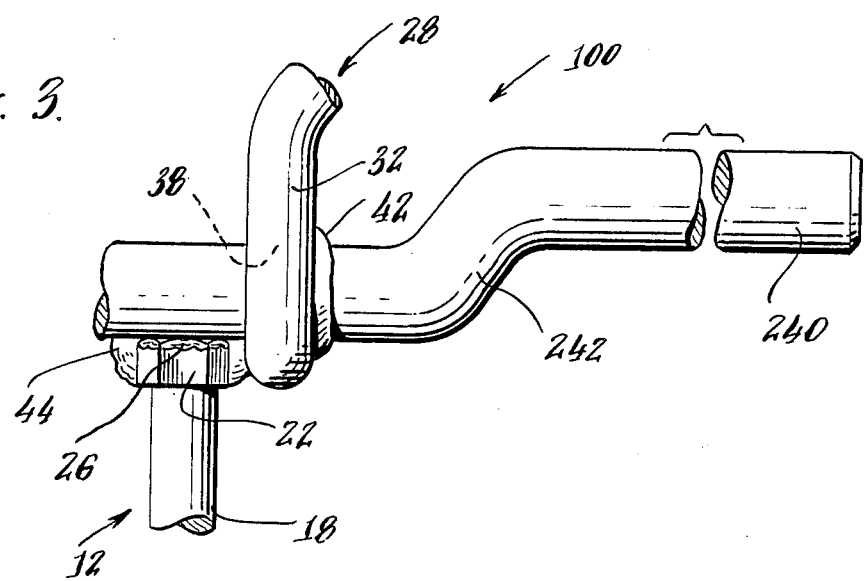
FIG. 3 is a fragmentary side elevation of a device that is a modified preferred embodiment of the invention.

FIG. 3 is a fragmentary side elevation of a device 100 that is a modified preferred embodiment of the invention. Device 100 is like device 10 except that device 100, instead of having a straight handle like handle 24, has a modified handle 240 that is offset away from lag bolt 12 as indicated at 242. Offset 242 is located adjacent bolt 12 and protects the user's knuckles against striking the article by increasing the distance between the user's knuckles and the article.

It is evident that the invention attains the stated objects and advantages and others.

The disclosed details are exemplary only and are not to be taken as limitations on the invention except as those details are included in the appended claims.

What is claimed is:

1. A device for engaging and holding an article, such as a wood log, to facilitate moving the same, said device including a bolt having a point with runout threads thereon, and a rigid handle secured to said bolt at a location spaced axially from the point and projecting laterally from the axis of said bolt, so that a user can wield the device by said handle to strike said article with said point to cause said point to penetrate the article and then rotate the handle to turn said bolt about its axis to force the bolt threads into threaded engagement with said article, a rigid shackle secured to said handle at a location substantially coincident with said bolt axis, said bolt and said shackle extending in opposite directions from said handle, so that said shackle can be grasped to move the article with said bolt in threaded engagement therewith.

2. A device according to claim 1 wherein said handle is a solid cylindrical steel rod.

3. A device according to claim 1 wherein said shackle has first and second spaced legs having aligned first and second holes therethrough, respectively, and said handle passes through said first and second holes, and the end of said bolt remote from said point is between said legs, said bolt and said shackle being welded to said handle.

4. A device according to claim 3 wherein said bolt is also welded to said shackle.

5. A device according to claim 3 wherein one end of said handle is substantially flush with said first leg and the other end of said handle projects a substantial distance from said second leg.

6. A device according to claim 1 wherein said handle is straight.

7. A device according to claim 1 wherein said handle is offset away from said bolt at a location adjacent said bolt.

* * * * *